INVENTOR.
HARRY RANDALL
BY Alfred E. Miller
ATTORNEY

3,186,695
GRAVITY FEED OVEN WITH SELECTING ROLLER
Harry Randall, 786 Connecticut Ave., South Norwalk, Conn.
Filed Sept. 25, 1962, Ser. No. 226,116
8 Claims. (Cl. 263—6)

This invention relates to a gravity feed device for separating a multiplicity of billets and passing them in an oriented, orderly and progressional manner through an oven for heating prior to putting the hot billets in forging presses for an ultimate stamping operation.

An object of the present invention is to provide a gravity feed device in the form of a hopper and chute which saves labor by enabling one person to load the hopper with a large number of billets and does not require constant attendance to insure that the billets pass with the proper orientation into the oven. Heretofore, an operator was required to be positioned at the entrance to the oven feed device which was located in a horizontal plane to push the billets by hand through the oven so that they receive the proper amount of heat treatment preparatory to forging and stamping. The prior method was not only time consuming but required the steady attendance of an operator at the entrance of the device. The aforesaid difficulty of the prior art has been overcome by the apparatus described in the present invention.

Another object of the present invention is the provision of adjustable legs for the hopper thereby providing an arrangement whereby the angle or slope of the hopper can be altered to insure the steady flow of billets to the oven proper.

A further object of the present invention is the provision of a billet agitator in the form of a fluted, grooved or spiked roller in the chute which is adjustable for depth of penetration of its peripheral surface into the chute area leading from the hopper. The roller is driven by a motor which has a speed reducer and a clutch operatively connected thereto. Thus, the roller may be adjustable to accommodate the different size billets passing underneath it in the desired orientation.

Another object of the present invention is to provide holes particularly located in the chute in the oven area to permit air circulation and to prevent distortion of the chute due to excessive heat. The chute is additionally provided with a stop mechanism for arresting the flow of billets along the chute when necessary.

A further object of the present invention is to provide a hopper and chute which is universally adaptable for use with existing ovens of the type presently being employed to heat billets.

Another object of the present invention is to provide a relatively inexpensive, easily assembled gravity feed device for billets which is reliably effective for the purposes intended.

The above and other features, objects and advantages of the present invention will be fully understood from the following description considered in connection with the accompanying illustrative drawings.

Figure 2:
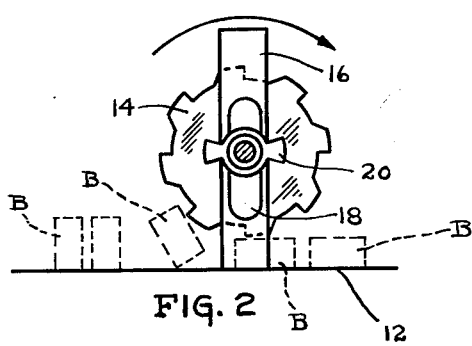
FIG. 2 is a sectional view of the roller and part of the chute.

Referring more particularly to the drawing embodying the concept of my invention, a hopper 10 is provided with a chute 12. Both the hopper 10 and the chute 12 are angularly displaced relative to the horizontal plane. The hopper is preferably located at an obtuse angle of approximately 120° to the horizontal plane. It should be noted that a large amount of billets B may be loaded into the hopper 10 and the billets fall by gravity down the chute 12. However, located partially down the chute 12 is a selecting roller 14, which may be fluted, grooved or spiked. The roller 14, as seen in FIG. 2, is adapted to rotate in a clockwise direction. The roller 14 also preferably has less than ½ of its peripheral surface in the interior of the chute 12 and is arranged so that the billets B pass under the rotating roller in progression and with a desired orientation, as clearly seen in FIG. 2. The roller 14 is vertically adjustable in two supports 16 (only one of which is shown) by means of slots 18 and wing nuts 20 thereby permitting an adjustment of penetration of the roller 14 into the interior of chute 12.

The billets B, after being selectively oriented by the roller 14, continue down the sloping chute 12 by action of gravity and into the oven 22. The portion of the chute 12 in the oven 22 is provided with a series of holes 24 to ensure the circulation of air therethrough and into the oven proper. The bottom 23 of the chute 12 projects through the opening 26 of the oven 22. Secured adjacent to opening 26 is a gas jet 28 for supplying heat to the end portion of chute 12 in the oven 22. The heat supply gas jet 28 is well known in the art and requires no further explanation.

Figure 3:
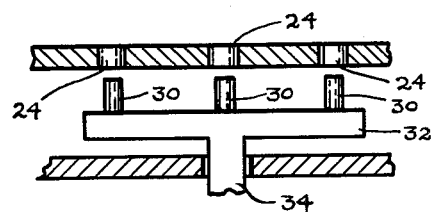
FIG. 3 is a part section, part elevational view of the stop device for billets in the oven.
Figure 1:
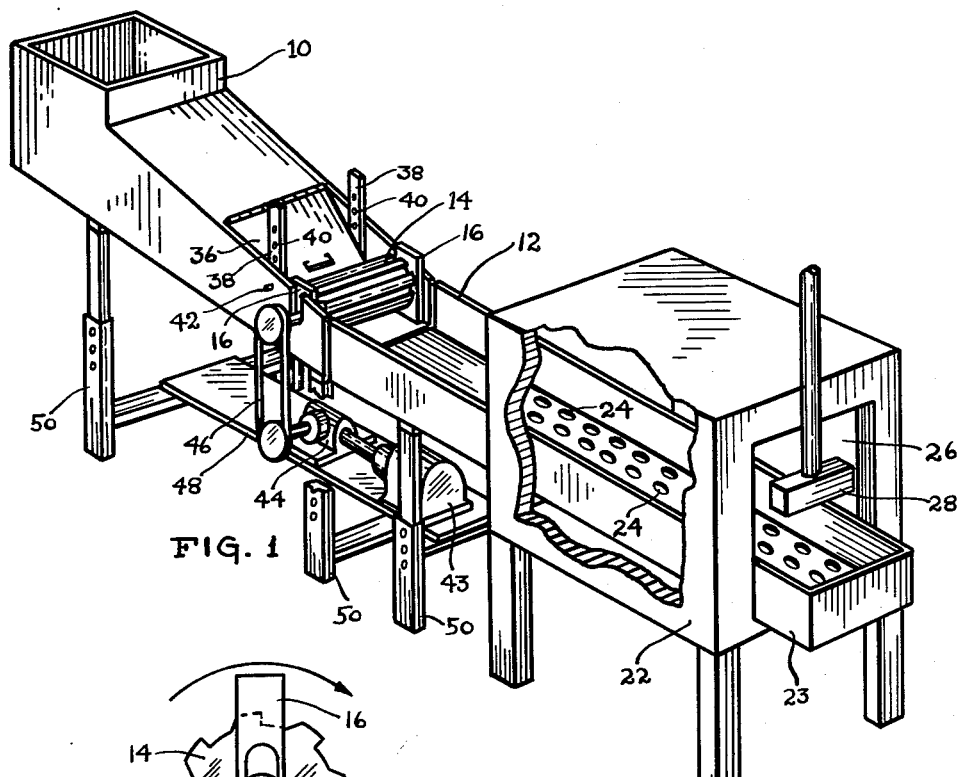
FIG. 1 is a perspective of the entire assembly constituting the embodiment of my invention.

If it is desired to stop the flow of billets B down the chute 12 a stop device of the type illustrated in FIGS. 1 and 3 is used. This stop device takes the form of upwardly extending projections 30 on a cross member 32. An operating arm 34 is utilized to manually elevate or lower the projections 30 through a set of holes 24 in the oven 22.

Adjacent to the roller 14 is a hinged door 36 having upstanding hangers 38 provided with adjusting apertures 40, the latter being selectively inserted over pins 42 projecting laterally into the interior of the chute 12. It should be apparent that the door 36 may be opened when and if necessary to remedy any crowding of billets at the area of the roller 14. The roller 14 is driven by a motor 43 through a clutch and speed reducer 44 and belt 46. The motor and associated structure are mounted on a platform 48 supported by adjustable legs 50. Thus, it should be noted, that the legs 50 may be adjusted to vary the pitch of the hopper 10 and chute 12.

It should be clearly apparent that a single operator can handle both the loading of a large number of billets into the hopper and the removal of the heated billets from the oven. This constitutes an important saving in labor as well as resulting in reliable apparatus that may be inexpensively built.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

It should also be noted that one person, for example the forging press operator, can operate the loading hopper, remove the hot billets from the furnace, and press the billets in the forging press to produce products of consistent uniform quality.

What I claim is:
1. An oven provided with a gravity feed device for separating and conducting billets in a predetermined orientation and progression to said oven, said gravity feed device being a hopper and connecting chute positioned at an obtuse angle relative to the horizontal plane, said oven enclosing a portion of the end of said chute, a roller with peripheral projections thereon, said roller being adjustably located at such a predetermined level in said chute that said roller is adapted to pass only one thickness of said billets, and means for rotating said roller in a clockwise direction whereby the billets in the hopper are passed individually under the roller and with said predetermined orientation into said oven.

2. An oven provided with a gravity feed device for separating and conducting billets in a predetermined orientation and progression to said oven, said gravity feed device being a hopper and connecting chute positioned at an angle of approximately 120° to the horizontal plane, said oven enclosing a portion of the end of said chute, a roller with peripheral projections thereon, said roller being adjustably located at such a predetermined level in said chute that said roller is adapted to pass only one thickness of said billets, means for rotating said roller in a clockwise direction whereby the billets in the hopper are passed individually under the roller and with said predetermined orientation into said oven, and a plurality of adjustable legs for said hopper and chute.

3. An oven provided with a gravity feed device for separating and conducting billets in a predetermined orientation and progression to said oven, said gravity feed device being a hopper and connecting chute positioned at an obtuse angle relative to the horizontal plane, said oven enclosing a portion of the end of said chute, a grooved roller being adjustably located at such a predetermined level in said chute forward of said oven that said roller is adapted to pass only one thickness of said billets, and means for rotating said roller in a clockwise direction whereby the billets in the hopper are passed individually under the roller and with said predetermined orientation into said oven.

4. An oven provided with a gravity feed device for separating and conducting billets in a predetermined orientation and progression to said oven as set forth in claim 1 wherein said oven is provided with a multiplicity of holes in the floor of said chute for the circulation of air therethrough.

5. An oven provided with a gravity feed device for separating and conducting billets in a predetermined orientation and progression to said oven as set forth in claim 4 further comprising a stop means removably projecting through said holes in said chute floor for selectively arresting the flow of billets through the oven.

6. An oven provided with a gravity feed device for separating and conducting billets in a predetermined orientation and progression to said oven comprising a hopper and connecting chute positioned at an obtuse angle relative to the horizontal plane, said oven enclosing a portion of the end of said chute, a roller with peripheral projections thereon, said roller being adjustably located at such a predetermined level in said chute that said roller is adapted to pass only one thickness of said billets, means for rotating said roller in a clockwise direction whereby the billets in the hopper are passed individually under the roller and with said predetermined orientation into said oven, and a trap door hingedly secured to said connecting chute adjacent to the billets in front of said roller.

7. An oven provided with a gravity feed device for separating and conducting billets in a predetermined orientation and progression to said oven comprising a hopper and connecting chute positioned at an obtuse angle relative to the horizontal plane, said oven enclosing a portion of the end of said chute, a roller with peripheral projections thereon, said roller being adjustably located at such a predetermined level in said chute that said roller is adapted to pass only one thickness of said billets, means for rotating said roller in a clockwise direction whereby the billets in the hopper are passed individually under the roller and with said predetermined orientation into said oven, and means for selectively adjusting the depth of penetration of said roller in the chute.

8. An oven provided with a gravity feed device for separating and conducting billets in a predetermined orientation and progression to said oven as claimed in claim 6 wherein said hinged trap door is provided at its free end with means to adjust the location thereof on said chute.

References Cited by the Examiner

UNITED STATES PATENTS

| | | | |
|---|---|---|---|
| 2,249,529 | 7/41 | Knights | 263—6 X |
| 2,792,131 | 5/57 | Miller | 214—18 |
| 2,823,812 | 2/58 | McCoy | 214—18 |

CHARLES SUKALO, *Primary Examiner.*